Levi Hermance's  
Improvement in Reservoir Cooking-Stoves.  
No. 117417.  
Patented Jul 25 1871
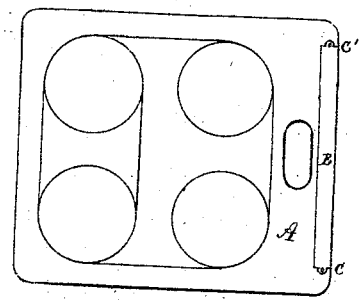
Fig. 1.
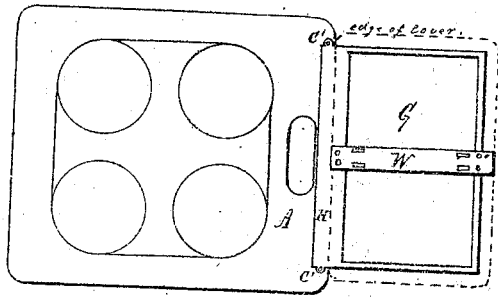
Fig. 2.
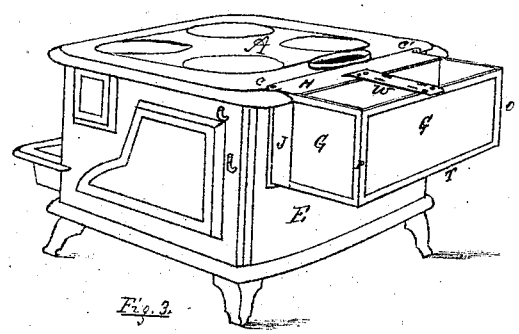
Fig. 3.
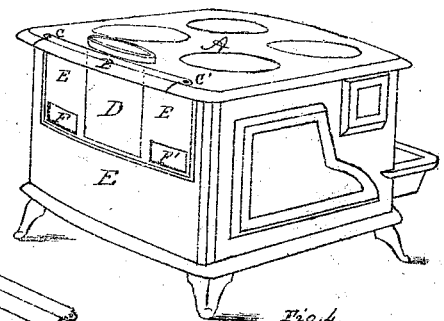
Fig. 4.
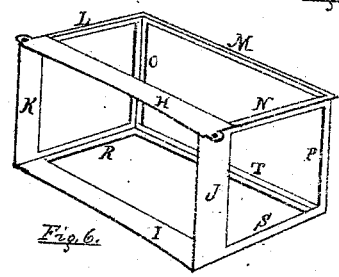
Fig. 6.
Fig. 5.
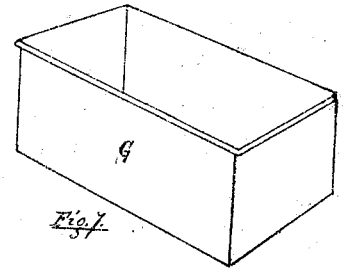
Fig. 7.
Fig. 10.
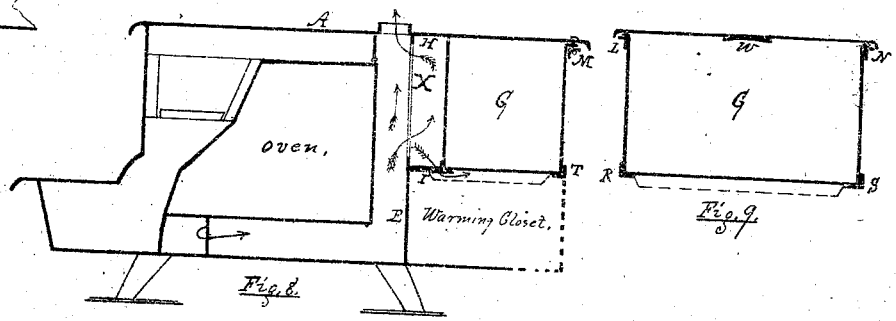
Fig. 8.
Fig. 9.
Witnesses.  
Richard W Reille  
A L Reille
Inventor.  
Levi Hermance

117417

2 Sheets, Sheet 2.

Witnesses.
Richard H. Reille
A. S. Reille

Inventor.
Levi Hermance 117,417

UNITED STATES PATENT OFFICE.

LEVI HERMANCE, OF LANSINGBURG, NEW YORK.

IMPROVEMENT IN COOKING-STOVES.

Specification forming part of Letters Patent No. 117,417, dated July 25, 1871.

*To all whom it may concern:*

Be it known that I, LEVI HERMANCE, of the village of Lansingburg, county of Rensselaer and State of New York, have invented certain new and useful Improvements in Reservoir Cooking-Stoves, of which the following is a specification:

The nature of my invention consists mainly in attaching a sheet-metal reservoir or water-tank to the rear part of a cooking-stove by means of a detachable cast-iron frame, all as more fully hereinafter set forth. The object of my invention is as follows, viz.: A stove is constructed as usual, except the back part of the top plate thereof, which is formed, as above described, with extra plate, filling the part cut or left out, dampers in back plate opening into descending flue or flues, and a removable plate closing an aperture opening into the center or ascending flue. In this way it forms a complete stove, and is sold (if required) and shipped in this manner. Should the purchaser at any time thereafter feel the want of a reservoir, he can have one sent ready to be attached, which can be done by any one in a very few minutes without trouble or difficulty. The reservoir is shipped, without danger, to any part of the world, and the object obtained is the heating of a sheet-metal reservoir situated or located at the back of a stove, and low down, either level with top plate of stove or below the same, or its top a trifle above, (as desired,) by direct heat imparted through apertures in and through the back plate of the stove.

Figure 11:
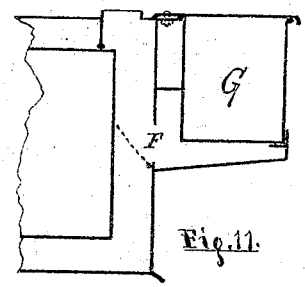
Figure 14:
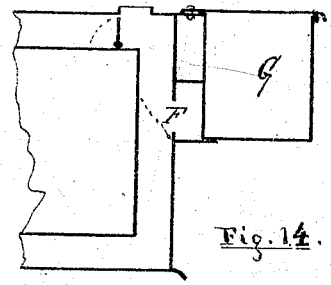
Figure 12:
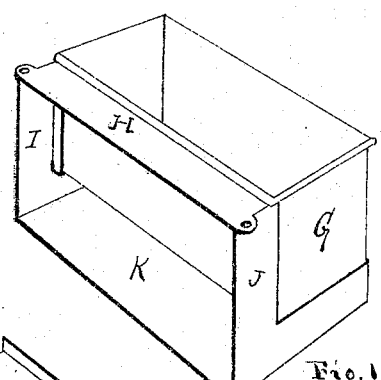
Figure 15:
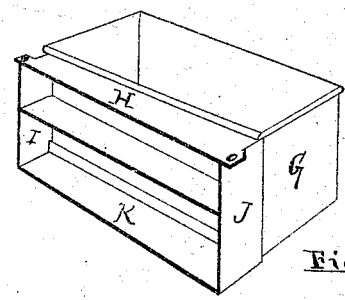
Figure 13:
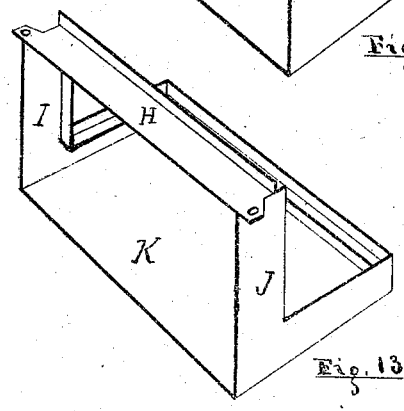
Figure 16:
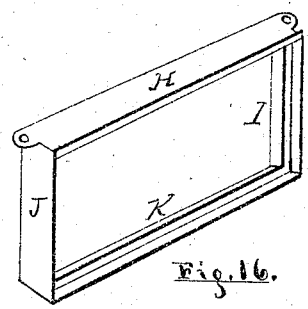

Figure 1 represents a horizontal view of the top of stove and removable plate. Fig. 2 is a horizontal view of the top plate of stove and reservoir combined, the removable plate away and reservoir-frame plate in its place. Fig. 3 is a perspective view of the stove and reservoir complete. Fig. 4 is a perspective view of the stove complete, without the reservoir. Fig. 5 is a perspective view of the removable plate alone. Fig. 6 is a perspective view of the reservoir-frame alone. Fig. 7 is a perspective view of the reservoir alone. Fig. 8 is a longitudinal vertical section of stove with reservoir attached, complete, dotted lines showing a warming-closet below, as usual. Fig. 9 is a transverse vertical section through reservoir. Fig. 10 is an enlarged section of one end of reservoir to show the angles of the frame-bars or plates. Fig. 11 is a vertical section of rear end of stove, showing the reservoir attached by plates inclosing chambers between it and stove; space under closed by a plate. The reservoir is fastened to the top plate of frame and sets into bottom plate. The top of reservoir is riveted to back of reservoir and to the plate, covering chamber front and filling space cut out of top plate of stove. The frame-work around top of reservoir and up back corners is omitted. Fig. 12 is the reservoir and frame-work, as in Fig. 11, without the stove, in perspective. Fig. 13 is the frame-work alone and in perspective. Fig. 14 is a vertical section of a similar arrangement, the plates under the reservoir being omitted, and the reservoir sustained by four plates, which inclose the chamber between it and the stove. Fig. 15 is the reservoir and frame-work of Fig. 14, in perspective and free from the stove. Fig. 16 is the frame-work alone and in perspective. In the drawing there are three ways of connecting the reservoir with the stove—one wherein the reservoir is sustained by the frame-work bending around all its corners, in connection with the wall-plates of chamber; and one wherein reservoir is sustained without the frame around top and at rear corners; and one where all frame-work is omitted except that inclosing the chamber between it and the stove.

Like letters refer to like or corresponding parts.

A represents the top plate of stove. B represents removable plate. This plate is formed to correspond with the design of stove-top, so that when in place the design is complete and the stove presents a finished appearance. At C and C' are depressions in the top plate with holes therein. At each end of a removable plate are projections corresponding with said depressions, and also having holes through. By passing screws, bolts, or rivets through the two plates the whole is secured and made permanent. D represents a plate covering and closing an aperture through back plate E of stove, and opening into ascending-flue. When the reservoir is attached this plate is removed, and also is plate B. F and F' are dampered apertures, opening into the corner or descending-flue or flues. Dampers of any suitable form, operated about as usual. It will be seen that the stove is complete and will operate perfectly without a reservoir. G represents the reservoir, which I prefer constructed of well-tinned sheet-copper, wired at the top, as usual. L, M, N, O, P, R, S, and T designate the parts of the frame-work incasing and sustaining the reservoir. This frame-work is of iron, and the several parts are properly riveted or otherwise joined together so as to make a rigid frame, and in style as shown on the drawing. H, I, J, and K are plates to which the just-before mentioned frame-work is properly riveted or otherwise joined, and of which they form a component part; they are made of proper width, so that when the reservoir is in the frame and the whole attached to the stove a chamber is formed, bounded thereby and between the reservoir and the back of stove, and into which the openings in stove-back communicate. The top plate H is formed corresponding to the removable plate B at it corners or ends, so that it, when attached to stove, is fastened in place precisely the same as plate B, previously removed. The lighter portions of the frame are formed so as to bend at right angles, inclosing the edges of the reservoir where necessary for strength, and to admit of riveting the same where required.

When shipped the reservoir is secured within the frame, and is thereby rendered less liable to become damaged before reaching its destination, and it makes a light and compact equipment. But, however, the frame may be sent separate, and the reservoir made separate at any place, and the whole readily joined by any person, as all that is required is to place the reservoir within the frame and attach the same to the stove, as described. When the stove-back is formed a molding is run around just where the edges of the frame strike, so as to cover the joint and assist in making it tight.

The top of the reservoir is covered as follows, viz.: At W is shown a plate reaching across the top, which is put on after the reservoir is within the frame. This plate is riveted to the plate H of the frame, and also to the upper bar M of the frame, and to this plate the valves are hinged in any of the usual styles, their edges covering the edges of reservoir and frame, making a neat job.

The reservoir being made of polished copper (well tinned inside) and the frame of iron, "blacked" or lacquered, forming, as it does, a paneling all around the reservoir, presents a neat and artistic appearance; while the stove and reservoir combined are lighter than usual, a desirable object when moved; and the facility with which they can be mounted or combined is another object fully attained.

The plate D, having been removed before the reservoir was attached, leaves the center flue open, so that the products of combustion can freely expand outward into the chamber X and the reservoir heated by the same before their exit, after having been around the oven of stove; and while the ordinary damper is closed, shutting from the stove the center, open the dampers at F and F', and the products of combustion descend the corner flues thereto, pass outward into chamber X, and thence into center flue, and escape as usual, so that it will be seen that the reservoir and its contents can be properly heated by direct as well as reversed draught, and all under proper control. The reservoir may be secured more permanently, when desirable, by means of rivets through the top plate of chamber X, or said top plate may be made to turn up at its back edge and the rim of the reservoir turn down to fit over the same; and when the top plate of reservoir is fastened on the whole is properly secured.

What I claim as new, and desire to secure by Letters Patent, is—

Attaching a sheet-metal reservoir or water-tank to the rear of a cooking-stove by means of the detachable frame, when constructed and arranged to operate substantially as and for the purpose as herein set forth.

LEVI HERMANCE.

Witnesses:
RICHARD H. REILLE,
A. S. REILLE.